United States Patent [19]

Brown

[11] 4,142,708

[45] Mar. 6, 1979

[54] VALVE AND SEAL

[75] Inventor: Warren D. Brown, Birmingham, Mich.

[73] Assignee: Sprayton Equipment Company, Franklin, Mich.

[21] Appl. No.: 676,909

[22] Filed: Apr. 14, 1976

[51] Int. Cl.² .............................................. F16K 5/00
[52] U.S. Cl. ..................... 251/317; 251/309; 137/246; 277/189.5
[58] Field of Search ................ 277/78, 81 R, 92, 139, 277/149, 165, 189.5; 251/309, 314, 317, 316; 137/246

[56] References Cited

U.S. PATENT DOCUMENTS

| | | | |
|---|---|---|---|
| 1,534,386 | 4/1925 | Heslewood | 277/78 |
| 2,282,455 | 5/1942 | Church et al. | 137/246 |
| 2,547,116 | 4/1951 | Gould | 251/309 |
| 2,728,620 | 12/1955 | Krueger | 277/78 |
| 2,760,794 | 8/1956 | Hartranft | 277/92 |
| 3,552,407 | 1/1971 | Hirano | 251/306 |
| 5,400,940 | 9/1968 | Conrad et al. | 277/81 |

Primary Examiner—William R. Cline
Assistant Examiner—H. Jay Spiegel
Attorney, Agent, or Firm—Harness, Dickey & Pierce

[57] ABSTRACT

There is disclosed herein a valve and seal assembly comprising a valve body having a movable core housed therein adapted to allow the flow of material through the valve to be interrupted, and means for sealing the core and body so as to prevent leakage. The valve is sealed against leakage through the cooperation of a pair of O rings disposed at opposite ends of the rotatable member and metal bars extending axially between these O rings and engaging portions of the core and body. The metal bars are retained in grooves provided in either the core or body and are surrounded by a layer of resilient material on three sides thereof which urge the exposed metal portion out of these grooves and into a sealing engagement with the opposing core or body surface and also prevent material flowing through the valve from entering the grooves. A similar seal in the form of a ring is also contemplated for use in sealing a rotating shaft.

12 Claims, 12 Drawing Figures

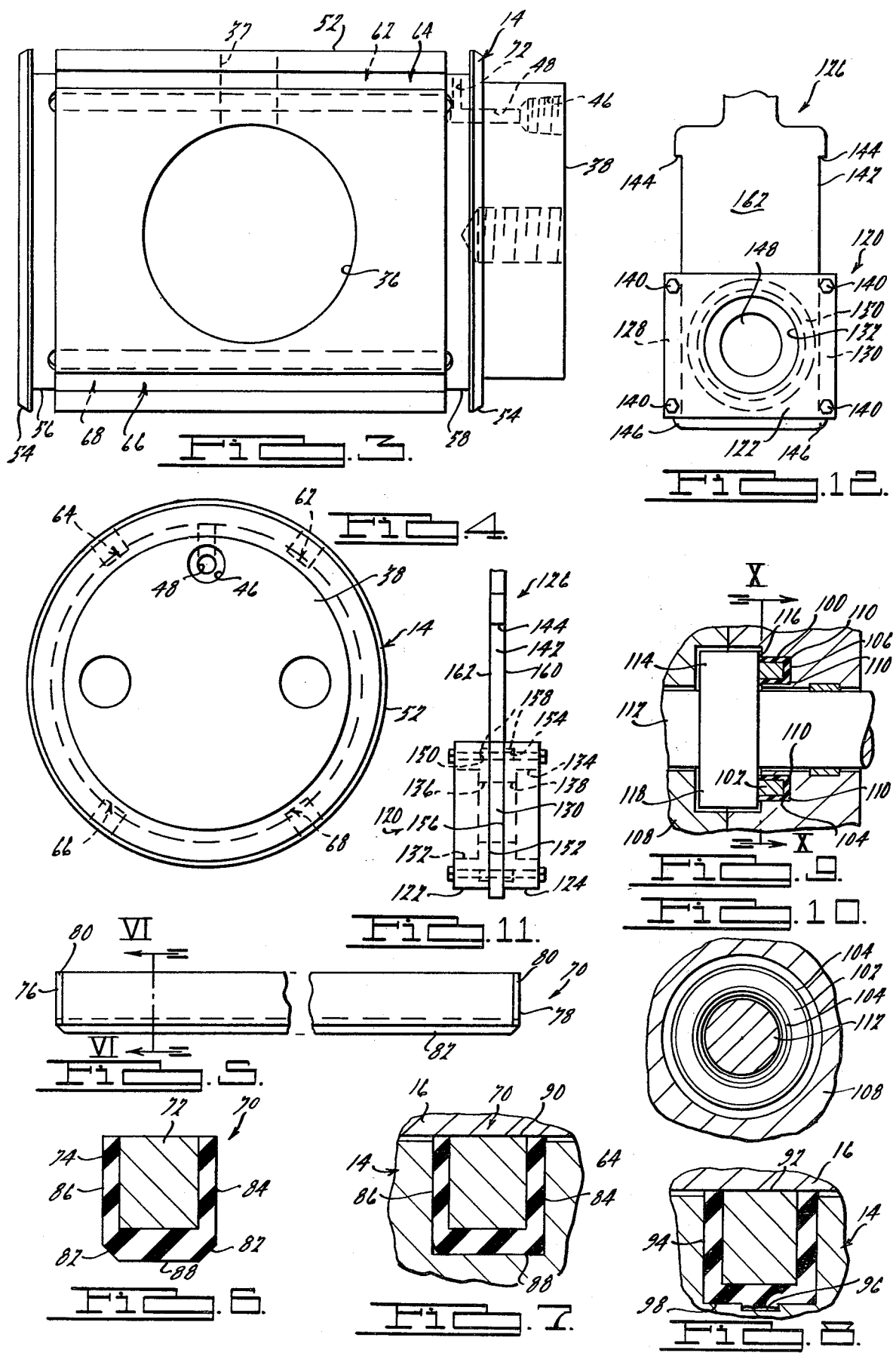

VALVE AND SEAL

BACKGROUND AND SUMMARY OF THE INVENTION

This invention relates generally to valve structures and means to effectively seal such valves against leakage and more particularly to such valves for use with flowing cementitious materials having both fine and course granular constituents which subject parts in the flow path to abrasive wear and tear.

One of the primary problems encountered in valves used in regulating the flow of pressurized, cementitious type materials is providing means which will effectively seal the valve against leakage of water from the cementitious material contained in the supply line when the valve is in the off position, which may prevent the resumption of flow when the valve is again turned to an open position, as the water also serves as a vehicle for assisting in the flow of the cementitious material. This phenomena is similar to that which occurs when the water is squeezed out of a handful of damp sand. Another problem is to provide such sealing means which will resist the extremely abrasive conditions created by the presence of the cementitious material, thereby affording reasonably long life span. Ordinary sealing means, which are generally in the form of rubber or other resilient materials commonly used to seal valves, are not satisfactory when used in valves through which pressurized concrete or other cementitious type materials are flowing as the abrasive nature of these materials increases the wear on these seals to the point that the life span of the seals is reduced to an unexceptable level. In addition to the abrasive wear, the concrete has a tendency to accumulate on the seals, set up, and thereby cause portions of the seals to break or chunk away when the valve is operated.

Accordingly, the present invention provides a unique sealing arrangement which overcomes these problems by providing a valve core which has a minimum clearance to the valve housing thereby excluding all but the smallest abrasive particles. The valve is then sealed against the leakage of even these small particles, as well as water, through the combination of a pair of O rings providing axial seals and bar seals extending between these O rings which prevent circumferential leakage. The bar seals are retained in the grooves provided on either the outer surface of the core or the inner surface of the valve housing and are comprised of a rectangular or square cross section bar or core member having resilient material secured thereto on three of its sides. This resilient material, being of a slightly greater thickness on the bottom, serves to urge the exposed side of the core member out of the groove and into sealing engagement with the opposing metal surface of the valve body or core. The bar seal also provides a wiping action as the valve is operated thereby minimizing the build-up of cement film occurring along the opposing metal surface thereof, which may adhere and eventually prohibit the valve from opening. A further advantage of major importance of this metal core type bar seal is its ability to resist outward deformation as the center portion of the seal passes over an inlet or outlet port which, if not restrained, could result in the outer portions of the resilient material being sheared off as the valve is operated. Typically, the metal core will limit this deflection to a maximum of about 0.001 inch.

Additional features and advantages of the present invention will become apparent from the following detailed description of the preferred embodiment taken in conjunction with the drawings.

BRIEF DESCRIPTION OF THE DRAWINGS

FIG. 3 is a side view of a valve core in accordance with the present invention;

FIG. 4 is an end view of the valve core of FIG. 3;

FIG. 5 is a longitudinal view of the bar seal of the present invention;

FIG. 6 is a cross-sectional view of the bar seal of FIG. 5 taken along line VI—VI thereof;

FIG. 7 is a view of the bar seal of FIG. 6 shown in an installed relationship to a portion of a valve core assembly;

FIG. 8 is a cross-sectional view of another embodiment of the bar seal of the present invention shown in an installed relationship to a portion of a modified valve core assembly;

FIG. 9 is a view of yet another embodiment of the present invention;

FIG. 10 is a view of the embodiment of FIG. 9 and sectioned along lines XI—XI thereof;

FIG. 11 is a side view of yet another embodiment of the present invention employed in sealing a typical slide valve; and FIG. 12 is a view of the embodiment of FIG. 11 as seen along the axis of the inlet and outlet thereof.

DETAILED DESCRIPTION OF THE PREFERRED EMBODIMENT

Figure 1:
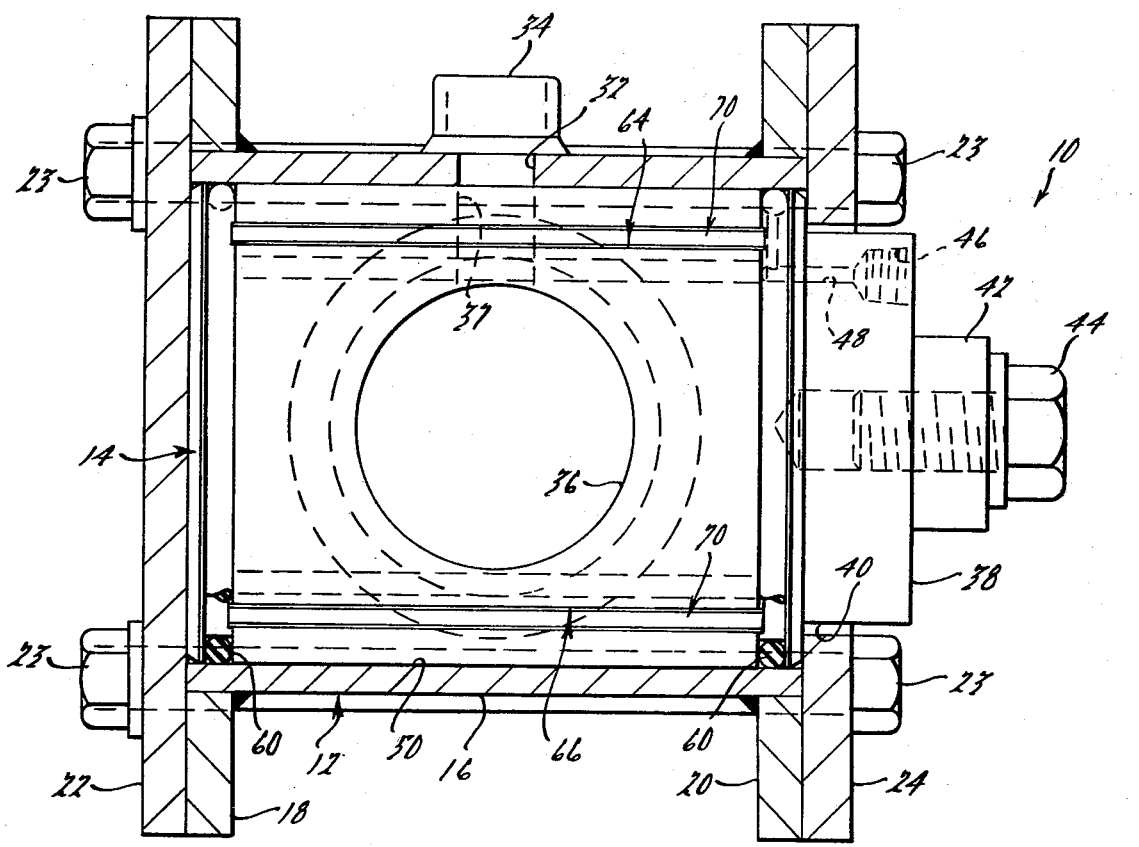
FIG. 1 is a side view of a valve in accordance with the present invention and sectioned along line I—I of FIG. 2.
Figure 2:
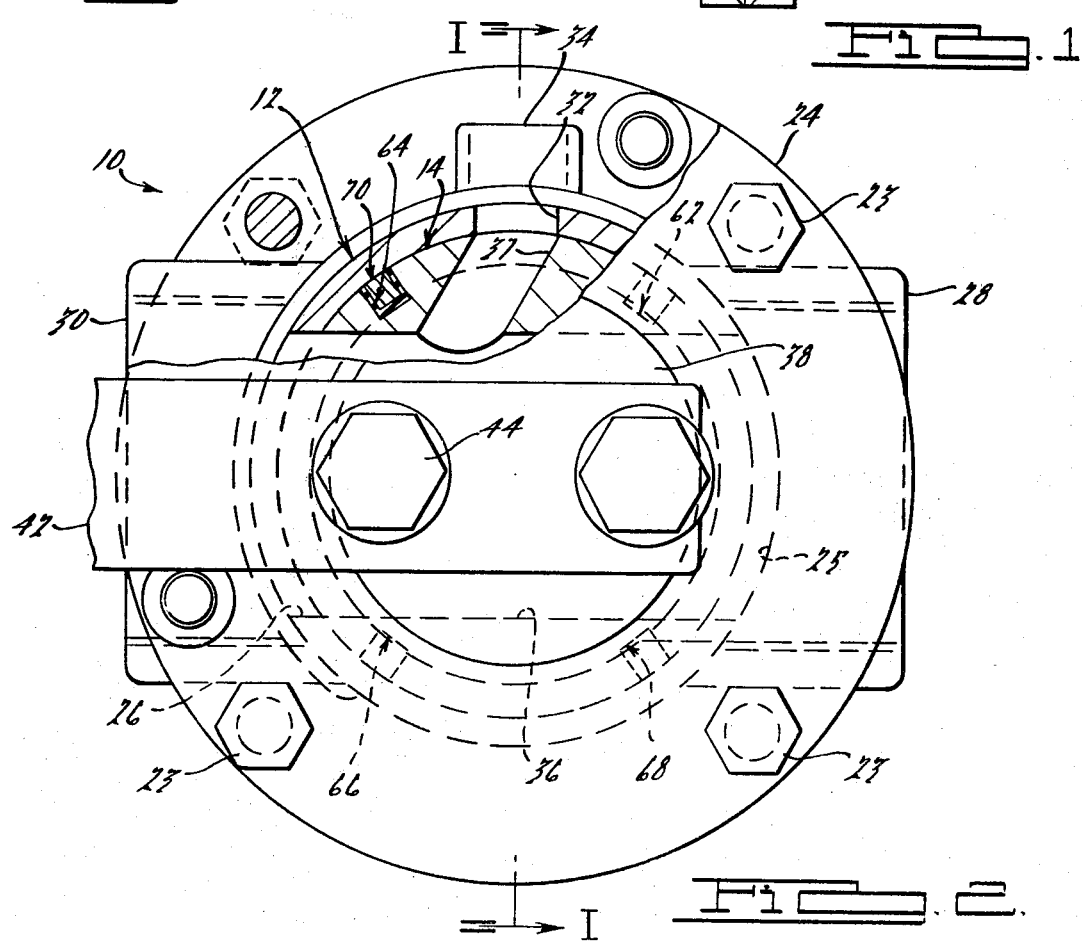
FIG. 2 is a top view of the valve of FIG. 1 having a portion of the housing broken away.

Referring now to the drawings and, in particular, FIGS. 1 and 2, there is shown a valve assembly 10 comprising a valve housing 12 and a valve core 14 disposed movably within the valve housing 12. The valve housing comprises a cylindrical shaped portion 16 having enlarged diameter flanges 18 and 20 at each of its longitudinal ends. Cover plate numbers 22 and 24 are secured to each of these enlarged diameter flanges 18 and 20 through the agency of a plurality of bolts 23. The cylindrical body portion also has a pair of relatively large apertures 25 and 26 on opposite sides thereof with conduit numbers 28 and 30 extending outward therefrom. The conduit numbers are adapted to allow the connection of an outlet and inlet supply lines (not shown). As shown in FIGS. 1 and 2, a third aperture 32 may be provided in the cylindrical member and a conduit member 34 attached thereto for supplying another material, such as air, to be mixed with the cementitious type material flowing through valve 10. Generally, this aperture and associated conduit member would be substantially smaller in diameter than the main inlet and outlet apertures 25 and 26 and conduit members 28 and 30. Disposed interiorly of the cylindrical member is valve core 14 which is generally cylindrical in shape and has a radial bore 36 extending therethrough. This radially extending bore 36 is adapted to communicate with the inlet and outlet apertures 25 and 26 in the cylindrical portion 16 when the valve core is in an open position and to be moved out of communication therewith when the valve core is turned to an off position, thereby selectively allowing material to flow through the valve or be prevented from so flowing. A second radial bore 37 of a smaller diameter may also be provided to communicate between bore 36 and third aperture 32 if desired.

The valve core 14 also has a reduced diameter cylindrical portion 38 extending outward through an aperture 40 in cover member 24. A handle 42 or other means to operate the valve is connected to this cylindrical portion by means of bolts 44, studs, or other suitable fasteners. An aperture 46 is also provided in portion 38 which communicates with a reduced diameter passage 48 extending further into the valve core to provide means for applying a lubricant to the valve core and associated seals, as hereinafter described.

As previously mentioned and best seen with reference to FIGS. 3 and 4, the valve core 14 is generally cylindrical in shape having an accurate diameter main body portion 52 adapted to provide a close fit to the interior wall 50 of cylindrical portion 16 of the valve housing 12 so as to prevent entrance of large particles between the valve core and valve housing. Typically, the clearance will be such as to preclude particles larger than about 0.003 inch from entering therebetween. The valve core is of a length approximately equal to the length of the cylindrical portion 16 of the valve housing. Each of the axial ends of the main body portion 52 of the valve core 14 have edges 54 which are slightly chamfered to provide a clearance between the valve core and housing portions and to prevent the valve core from becoming jammed. A pair of circumferential grooves 56 and 58 are disposed immediately adjacent the axial ends of the valve core and each is adapted to accommodate an O ring 60, as shown in FIG. 1, thereby providing an axial seal against leakage between the valve housing and core. Circumferential sealing means comprise axially extending grooves 62, 64, 66 and 68 disposed on either side of the radially extending bore 36. A bar seal 70, as described below, is disposed in each of these grooves and provides a circumferential leakage seal as well as a wiping action to remove the cementitious material film which may collect on either the valve core or housing wall surfaces. Generally, the valve core will have four of these grooves; one disposed on either side of the radial extending bore openings with a bar seal disposed in each of these grooves. As previously mentioned, aperture 46 is disposed in portion 38 of valve core 14 and communicates with passageway 48. Passageway 48 has a dog leg 72 extending radially outward so as to communicate with groove 58. A lubricant is fed, under pressure, through aperture 46 along passageway 48 and dog leg 72 to O ring 60. This lubricant may then seep along groove 58, axially through grooves 62, 64, 66 and 68 and around groove 56, thereby providing lubrication to both of the O ring seals and to each of the bar seals. Preferably, a viscous, petroleum based lubricant is used, such as a suitable grease or the like, so as to prevent excessive seepage past the seals into the cementitious materials flowing through the valve. Such a lubricant, in addition to reducing friction, also serves to prevent the cementitious materials from setting up in the vicinity of the seals and thereby causing the respective seals to become jammed in their respective grooves. It is desirable to provide a suitable pressure grease fitting threadedly secured in aperture 46.

Bar seal 70 is shown in isolation in FIGS. 5 and 6. As seen therein, bar seal 70 is generally rectangular in shape and has a length slightly longer than the length of grooves 62, 64, 66 and 68 disposed on the valve core 14. Thus, when the bar seals 70 are installed in these grooves, the end portions 72 and 74 thereof will engage and slightly compress O rings 60, thereby precluding leakage at this junction. As best seen with reference to FIG. 6, the bar seal 70 is comprised of a metal core 72, generally square or rectangular in shape, having three of the four longitudinal sides, and optionally its end portions, encased in a resilient type material 74. The core portion is preferably fabricated from a relatively soft metal, such as brass or mild steel for example. However, if desirable, it may even be fabricated from a plastic composition. The resilient material 74 may be any suitable rubber composition characterized by high hardness, high tensile strength, low compression set, low water absorption, and good grease resistance. The lower longitudinally extending edges 82 of the bar seal 70 are chamfered so as to provide clearance for compression of resilient material 74, as well as passageways for the lubricant.

Bar seal 70 is shown in an installed relationship to a groove 64 disposed in the outer surface of the core 14, only a portion of which is shown in FIG. 7. Groove 64 is of a lateral width so as to engage the side wall portions 84 and 86 of the resilient coating with or without compressing them, thereby allowing the bar seal to move into and out of the groove. Groove 64 is of a depth less than the height of the bar seal, thus causing the bottom portion 88 of the resilient material, which is substantially thicker than sidewall portions 84 and 86, to be compressed when the seal is in an operating relationship to the core 14 and body 12. Typically, groove 64 will be of a depth so as to cause bottom portion 88 of the resilient material to be compressed approximately 0.020 inch when bar seal is in a sealing relationship with housing portion 16. This compressed resilient material serves to urge the core member out of the groove and into engagement with cylindrical portion 16 of the valve body 12, thus creating a sealing relationship therebetween. Preferably, both the valve core 14 and valve body 12 will be fabricated of a substantially harder material than bar seal 70, such as a hardened steel or the like, thus insuring the bar seal 70 will absorb a major portion of the wear. As the outer surface 90 of core member 72 is worn away, the compressed resilient material will cause core member 72 to move further out of the groove 64, thereby maintaining the sealing relationship for a substantially longer time than conventional valve seals. It should be noted that the side wall portions 84 and 86 of the resilient material 74 may or may not be under slight compression and serve mainly to prevent cementitious material from seeping between the junction of the bar seal and groove setting there, and thus jamming or freezing the bar seal in position. The core member 72 of bar seal 70 also serves to prevent resilient material 74 from deforming or bulging outward as the seal passes across any of the apertures provided in the valve body 12 and being sheared off thereby. Typically, the core member will be of such a stiffness as to prevent outward deflection greater than about 0.001 inch.

FIG. 8 illustrates another embodiment of the bar seal of the present invention indicated generally at 92, disposed in a modified groove 94. Bar seal 92 is similar in construction to bar seal 70 but is formed with relatively squared off edges as opposed to the chamfered edges 82 of bar seal 70. Groove 94 is also similar to groove 64 of FIG. 7 but has an additional narrow, shallow, longitudinally extending groove 96 disposed in bottom surface 98 of groove 94. Groove 96 allows the resilient material to be partially compressed therein when bar seal 92 is in operative relationship thereto, as well as providing a lubrication passageway therealong. The function and operation of bar seal 92 is otherwise identical to that described with reference to bar seal 70 and repetition thereof is believed unnecessary.

It should be noted that, while the above description of the preferred embodiment has been illustrated with reference to an arrangement having the bar seals installed in grooves provided on the outer surface of the valve core; if desirable, the grooves and bar seals may be disposed on the inner surface of cylindrical portion 16 of the valve body 12 with equal effectiveness and identical operation.

Referring now to FIG. 9, there is shown yet another embodiment of the bar seal of the present invention utilized as a seal for a rotating shaft such as may be provided in cementitious material mixing equipment. Seal 100 is of a similar construction to that of bar seals 70 and 92, having a relatively soft metal or plastic composition core 102 surrounded on both its radially inner and outer surfaces and one of the two axial surfaces by a resilient material 104. As shown in FIGS. 9 and 10, seal 100 is generally circular in shape and is disposed in a groove 106 provided in a portion of a shaft supporting structure 108. Resilient material 104 is formed with chamfered edges 110 which, in cooperation with groove 106, define lubrication passageways therebetween. Alternatively, the resilient material may be formed with a groove disposed therein to provide a lubrication passageway similar to that described with reference to FIG. 8. Rotating shaft 112 has an annular flange 114 thereon having a surface 116 adapted to engage seal 100 which is urged out of groove 106 in like manner to that described with reference to bar seal 70, thereby providing a seal around the shaft while allowing it to rotate freely. If desired, a second seal may be provided in shaft supporting structure 108 disposed so as to engage surface 118 of annular flange 114, thereby insuring that axial movement of the shaft does not defeat the sealing. It should also be noted that in this application as well, the seal 100 may be disposed in a groove provided on surface 116 of annular flange 114 with equal effectiveness and identical operation.

Referring now to FIG. 11 and 12, there is shown yet another embodiment of the bar seal of the present invention adapted for use in sealing a slide valve 120. Slide valve 120 is comprised of a pair of relatively thick housing/connecting flanges 122 and 124, a slide core 126 and a pair of filler plates 128 and 130. Housing/connecting flanges 122 and 124 each have a bore 132 and 134 extending therethrough, both of which are adapted to accommodate the connection of an inlet means and an outlet means such as pipes or hoses or the like. Bore 132 has a reduced diameter portion 136, and similarly bore 134 has a reduced diameter portion 138. Housing/connecting flanges are secured together by bolts 140 or the like, with filler plates 128 and 130 therebetween extending substantially parallel and disposed at the lateral extremes thereof. Slide core 126 comprises a generally wide elongated plate having a main body portion 142 which is adapted to slide between housing/connecting flanges 122 and 124 and between filler plates 128 and 130. Slide core 126 also has tab portions 144 disposed at the upper end of main body portion 142 which serve to limit the travel of slide core between housing/connecting flanges 122 and 124. Similarly, tab portions 146 limit the upward travel of slide core 126. Slide core 126 has an aperture 148 of approximately the same diameter as reduced diameter portions 136 and 138 and adapted to communicate therewith when slide core is in a open position thus allowing material to flow through slide valve 120.

Housing/connecting flange 122 has an annular groove 150 surrounding aperture 132 and disposed in surface 152 thereof. Similarly, housing/connecting flange 124 has an annular groove 154 disposed in surface 156 thereof and surrounding aperture 134. Bar seals 158, similar to that described with reference to FIGS. 9 and 10, are disposed in each of these grooves and are adapted to engage opposite facing surfaces 160 and 162 of slide core 126 in a sealing relationship thereby preventing any leakage therebetween.

From the foregoing, it is apparent that various changes and modifications may become apparent to one skilled in the art, and therefore, the scope of the present invention should not be limited by the detailed description of the preferred embodiment but rather should be limited only by the claims appended hereto.

I claim:

1. A plug type valve structure for selectively permitting or preventing the flow of a cementitious material between a source of supply and discharge means comprising:
   a main body housing:
   inlet means disposed on said main body housing;
   outlet means disposed on said main body housing;
   a generally cylindrical valve core member movably retained within said main body housing and adapted to allow said cementitious material to flow between said inlet means and said outlet means when in a first predetermined position and to prevent said flow when in a second predetermined position;
   a plurality of longitudinally extending spaced apart grooves disposed on said valve core;
   a replaceable elongated bar sealing means disposed in each of said grooves and adapted to slidingly engage said main body housing in a sealing relationship for preventing circumferential leakage of said cementitious material between said valve housing and said valve core, each of said elongated bar sealing means comprising a noncompressible core member having a relatively flat surface continuously engaging said main body housing and
   resilient means surrounding substantially all but said relatively flat surface of said core member, said bar sealing means being of a generally rectangular cross-sectional shape and having a width slightly greater than the width of said groove so as to place said resilient means in sealing engagement with sidewalls of said groove to thereby limit seepage of said cementitious material therebetween and a height greater than the depth of said groove whereby said resilient means are operative to maintain and continuously urge said elongated bar sealing means into engagement with said main body housing as said elongated bar sealing means become worn; and
   a plurality of annular sealing means adapted to prevent axial leakage between said valve core and said valve housing.

2. A valve as set forth in claim 1 wherein said resilient material is formed so as to provide means for supplying lubricant between said resilient material and said groove, said valve core having means for externally supplying said lubricant.

3. A valve as set forth in claim 2 wherein said core is generally rectangular, said means for supplying lubricant between said resilient material and said groove comprising chamfered edges formed on said resilient material, said chamfered edges forming passageways for said lubricant.

4. A valve as set forth in claim 2 wherein said core member is generally rectangular, said means for supplying said lubricant between said groove and said resilient material comprising a second groove formed in a portion of said groove.

5. A valve structure as set forth in claim 1 wherein said resilient material is compressed in said groove along a longitudinally extending portion, said resilient material causing said core member to be urged out of said groove and into said sealing engagement.

6. A valve structure as set forth in claim 1 wherein said resilient material has chamfered longitudinally extending edges.

7. A valve structure as set forth in claim 1 wherein said groove has a second longitudinally extending groove formed in a portion of said groove.

8. A valve structure as set forth in claim 1 wherein said resilient material is of a rubber composition.

9. A valve structure as set forth in claim 8 wherein said core member is of a soft metal.

10. A valve structure as set forth in claim 8 wherein said core is of a plastic composition.

11. A valve as set forth in claim 1 wherein said bar sealing means are moved across inlet and outlet openings provided in said valve housing members, and said core is operative to limit outward deformation of said resilient material into said inlet and outlet openings.

12. A valve structure as set forth in claim 1 wherein said noncompressible core member and said resilient means further cooperate to provide a wiping action on said main body housing, thereby preventing a buildup of said cementitious material.

* * * * *